United States Patent [19]

Oswald et al.

[11] 4,076,907
[45] Feb. 28, 1978

[54] PAPER-LINED DRY CELL BATTERIES WITHOUT SMEARS

[75] Inventors: Anton H. Oswald; John Peters, both of Wayne, N.J.

[73] Assignee: Bright Star Industries, Inc., Clifton, N.J.

[21] Appl. No.: 713,668

[22] Filed: Aug. 12, 1976

[51] Int. Cl.² .......................................... H01M 2/18
[52] U.S. Cl. .................................................. 429/133
[58] Field of Search ............................ 429/133–141, 429/164–174

[56] References Cited

U.S. PATENT DOCUMENTS

| 3,089,914 | 5/1963  | Carmichael et al. | 429/133 |
| 3,463,669 | 8/1969  | Jammet            | 429/133 |
| 3,748,181 | 7/1973  | Alberto           | 429/133 |
| 3,764,392 | 10/1973 | Kuwazaki et al.   | 429/135 |
| 3,985,573 | 10/1976 | Johnson et al.    | 429/133 |

Primary Examiner—Charles F. LeFevour
Attorney, Agent, or Firm—James & Franklin

[57] ABSTRACT

A paper-lined dry cell battery includes an electrically insulating band over the full circumference of the inner surface of the can sidewall from a point below the level of the upper end of the liner to a point substantially thereabove, thereby to electrically insulate a segment of the can sidewall from smears.

9 Claims, 4 Drawing Figures

PAPER-LINED DRY CELL BATTERIES WITHOUT SMEARS

BACKGROUND OF THE INVENTION

A popular method employed in the manufacture of Leclanche or zinc-carbon dry cell batteries utilizes a so-called "paper liner" inside the zinc can to physically and electrically separate the zinc can (negative terminal) from the "depolarizer mix" surrounding the carbon rod (positive terminal). During manufacture, the inorganic salts and the water, which are to eventually become the battery's electrolyte, have been mixed into the depolarizer mix. Subsequent to manufacture the paper liner absorbs the electrolyte, becoming saturated with it, and for all practical purposes, the paper liner and the electrolyte become one and the same. It is important to recognize, at this point, that the depolarizer mix consists of materials which yield an electrically conductive mixture of low resistivity. Therefore, the electrical potential or e.m.f., measured at any point on the surface of, or within the mass of, the depolarizer mix is essentially the same potential or e.m.f. as measured at the carbon rod.

From the foregoing, it may be seen that three distinct electrical circuit elements may be identified in the finished battery, as follows:

(1) The zinc can (the negative terminal);
(2) The saturated paper liner and the electrolyte; and
(3) The carbon rod (the positive terminal) along with the surrounding mass of depolarizer mix.

Numerous techniques have been devised and employed to introduce the battery's various components into the zinc can in the proper sequence and under the required conditions. While no effort will be made here to review all of these techniques, two will be mentioned in order to illustrate the nature of the problem which the subject invention is intended to overcome.

Technique A. A rolled sheet of liner paper of appropriate size is first inserted into the zinc can, and then allowed to unroll against the inner wall of the can. A flat disc or "bottom washer" of paper, slightly larger than the can's inside diameter, is then pushed down to the bottom of the can. A controlled quantity of depolarizer mix is deposited within the paper enclosure formed by the sheet and disc, then a wipe-down washer and the carbon rod are placed in position. While the carbon rod is still held in place, a suitably shaped plunger is pressed against the wipe-down washer atop the depolarizer mix for the purpose of compacting the depolarizer mix around the carbon rod and against the paper liner, the compacted depolarizer mix forming a "bobbin."

Technique B. A preformed liner paper bag of suitable dimensions is filled with a controlled quantity of depolarizer mix, the filled bag is inserted into the zinc can, and then the carbon rod is inserted, with subsequent steps essentially those of Technique A.

The difficulty that results in the rapid spoilage of a significant percentage of batteries being manufactured is the production of "smears." These smears consist of a quantity of depolarizer mix which somehow, despite all efforts directed toward prevention, is deposited in a location which effectively "short circuits" the cell.

In Technique A, for example, a quantity of depolarizer mix may coat the paper liner while the mix is being inserted into the cell. If this coating extends to and over the top edge of the paper liner, it will eventually "bridge" or "short circuit" across the linear. In Technique B, for example, the relationship of the dimensions of the preformed liner paper bag relative to those of the can is critical, and any gap between bag and can permits the bag to burst during the compacting operation. Here again, mix leaking through the burst point will constitute a "bridge" or "short circuit" across the liner.

It is an object of the present invention to provide a method of making paper-lined dry cell batteries by Technique A which avoids the possibility of smear formation.

It is another object to provide such a method which does not reduce the efficiency of the battery.

It is a further object to provide such a method which is economical relative to a conventional battery making process.

Another object is to provide batteries made by such a method.

SUMMARY OF THE INVENTION

It has now been found that the above and related objects of the present invention are obtained in a conventional paper-lined dry cell battery by the introducing of a band formed substantially of electrically insulating material and disposed over the full circumference of the inner surface of the receptacle sidewall, substantially from a first point below the level of the upper end of the liner to a second point substantially thereabove, thereby to electrically insulate a segment of the receptacle sidewall.

A paper-lined dry cell battery according to the present invention comprises a first terminal, a second terminal, an ion-permeable liner, a mass of depolarizer mix and the aforementioned electrically insulating band. The first terminal comprises a receptacle having a base and a sidewall extending upwardly therefrom to a given height, and is typically the negative terminal or can. The second terminal is disposed within the receptacle but spaced therefrom, and is typically the positive terminal. The ion-permeable liner is disposed within the receptacle between the second terminal and the receptacle and extends upwardly to a second height less than the given height. The mass of depolarizer mix includes an electrolyte, the mass being disposed between the second terminal and the liner and extending upwardly to a third height less than the second height. As aforementioned, the band is formed substantially of an electrically insulating material and is disposed over the full circumference of the inner surface of the receptacle sidewall substantially from a first point below the level of the upper end of the liner to the second point substantially thereabove. The band electrically insulates a segment of the receptacle sidewall from the depolarizer mix, thus precluding the possibility of smears.

In a preferred embodiment, the second point or top surface of the band is substantially below the upper end of the receptacle sidewall, although it may also be disposed substantially at the upper end of the receptacle sidewall. The first point or bottom of the band is substantially adjacent the upper surface of the depolarizer mix, and preferably at or above the upper surface of the depolarizer mix to preclude interference with the efficiency of the battery.

The electrically insulating material of the band is generally a resin, shellac, varnish or lacquer, preferably an alkyd resin, and is conveniently applied as a spray coating on the receptacle sidewall, using an appropriate solvent if necessary.

The process for the manufacture of the paper-lined dry cell battery according to the present invention includes the step, prior to insertion of the liner, of applying the aforementioned band as indicated. Thus, the process comprises providing a first terminal comprising a receptacle having a base and sidewall extending upwardly therefrom. The first terminal has a band formed substantially of electrically insulating material disposed over the full circumference of the inner surface of the receptacle sidewall substantially from a first point below the level which will correspond to the upper end of the liner to a second point substantially thereabove. An ion-permeable liner is then inserted within the receptacle so that the level of the upper end of the liner is spaced below the top of the receptacle sidewall. Next a mass of depolarizer mix containing electrolyte is fed into the liner and a second terminal is positioned at least partially within the depolarizer mix mass. Finally, the depolarizer mix mass is compacted inwardly against the second terminal and outwardly against the receptacle sidewall. Preferably the depolarizer mix mass is fed and compacted so that the top of the depolarizer mix mass is substantially at or below the level of the bottom of the band.

DETAILED DESCRIPTION OF THE PREFERRED EMBODIMENTS

Figure 1:
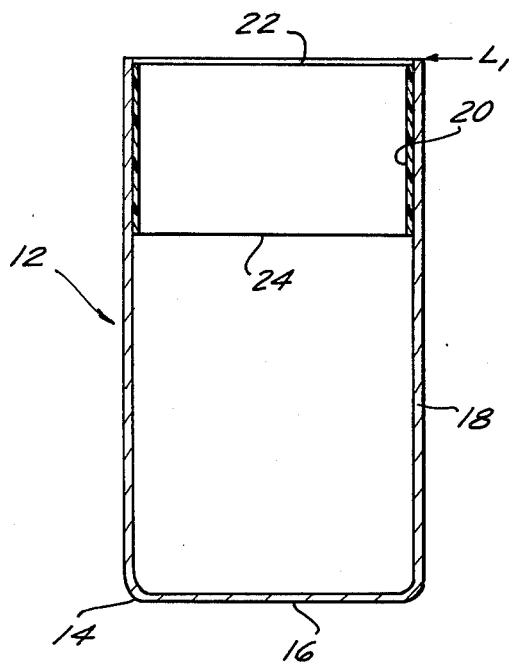
FIG. 1 is a sectional elevation view of a zinc can component of a battery according to the present invention after application thereto of the insulating coating.

Referring now to the drawing, FIGS. 1–4 illustrate the progressive stages in the manufacture of a paper-lined dry cell battery according to the present invention. Referring now to FIG. 1, a negative terminal generally designated by the numeral 12 comprises a receptacle 14, commonly referred to as a can and having a base 16 and a sidewall 18 extending upwardly therefrom to a given level $L_1$. The diameter of the base 16 and the length of the sidewall 18 will be determined by the application for which the particular battery is designed.

A band generally designated by the numeral 20 has a top surface 22 and a bottom surface 24, and is formed substantially of an electrically insulating material. The band 20 is disposed over the full circumference of the inner surface of the can sidewall 18 from generally the level of the upper surface thereof downwardly to a given level. Theoretically the top surface 22 of band 20 may be substantially at the upper end or top of the can sidewall 18; however, positioning the top surface 22 of the band 20 a substantial distance (say, 0.5 millimeters) below the upper surface of the can sidewall 18 is preferred as it insures that no portion of the band 20 will extend over the top of the can sidewall 18 where it might affect any machinery contacting the can 14 during the subsequent processing steps.

The band 20 is composed of substantially any electrically insulating material such as the various high resistance resins, lacquers, shellacs, varnishes and the like well recognized by those in the electrical arts, the preferred materials being the synthetic resins, especially the alkyd resins. The band 20 may be a separate component applied within and secured to the can 14, but is more conveniently applied thereon through a suitable spray nozzle as a spray coating or by being painted thereon. The insulating material may be compounded with an aromatic solvent (such as xylene) to facilitate application as a paint on the can, a paint drier (such as lead or cobalt compound) to reduce drying time after application, and a hiding pigment (such as carbon black) to facilitate detection of any discontinuities in the insulating material band during quality control testing. A preferred insulating material for the purposes of the present invention is the air drying alkyd resin varnish available under the trademark "7X-1B" from Debevoise Co. (Brooklyn, New York).

Figure 2:
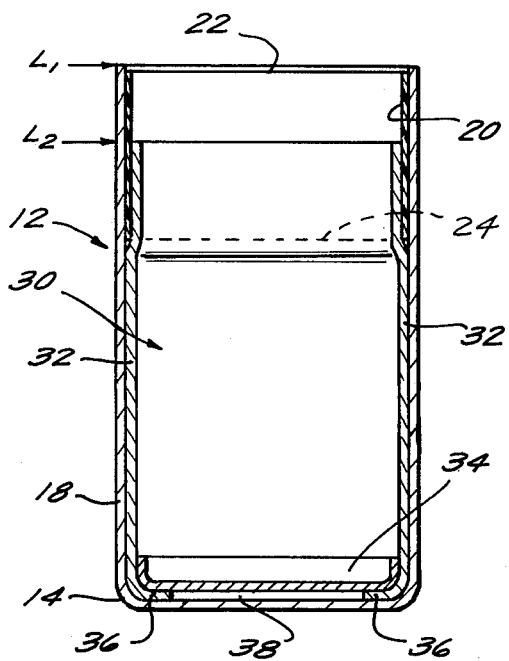
FIG. 2 is a sectional elevation view of the components of FIG. 1 after addition thereto of a paper liner and the bottom washer.

Referring now to FIG. 2, an open-top compartment generally designated by the numeral 30 is formed in the can 14 in two steps using a generally cylindrical liner sheet 32 and a bottom washer 34. In the first step, the liner sheet 32 is rolled in a generally cylindrical fashion, inserted into the can 14 through the open top thereof, and allowed to unroll against the inner surface of sidewall 18. The bottom portion of the liner sheet 32 contains an inwardly directed flange 36 which rests on the case base 16 and defines an aperture 38. In the second step, a bottom washer 34 is pushed downwardly through the open top of the can 14 and through the open central portion of the liner sheet 32 (FIG. 2 shows the bottom washer 34 in this intermediate position) until it is finally adjacent the can base. 16. In effect, liner sheet 32 and bottom washer 34 form a compartment adapted to receive and hold the depolarizer mix therein. The liner sheet 32 extends from a point substantially below the bottom surface 24 of band 20 upwardly to a given level $L_2$ substantially below the top surface 22 of the band 20. In other words, the band 20 extends substantially from a first point below the level $L_2$ of the upper end of the liner sheet 32 to a second point substantially above the level $L_2$.

Figure 3:
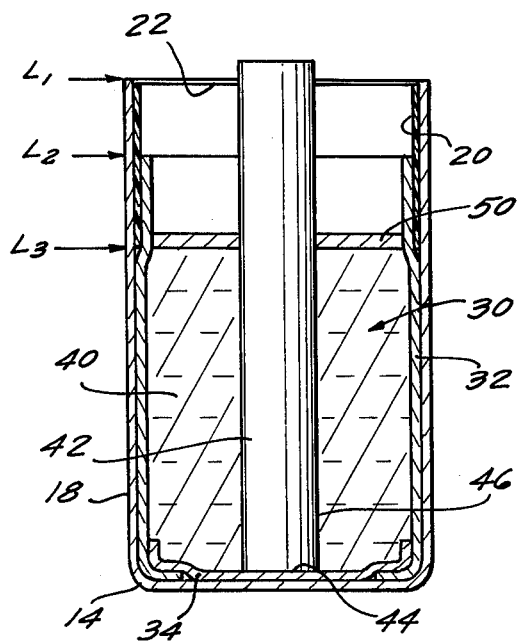
FIG. 3 is a sectional elevation view of the components of FIG. 2 after addition thereto of a wipedown washer and carbon rod.

Referring now to FIG. 3, a predetermined quantity of depolarizer mix 40 is inserted into the compartment 30 by conventional means well known to those in the battery art. A wipe-down washer 50, apertured to allow later passage therethrough of the positive terminal, is then placed atop the upper surface of the depolarizer mix 40 to a level substantially below the level $L_2$ of the top of the liner sheet 32. Next a positive terminal 42, commonly referred to as a rod and having a base 44 and an outerwall 46 extending upwardly therefrom, is inserted into the center of the can 14 (through the wipe-down washer aperture) and pressed against the bottom washer 34. A plunger (not shown) is then pressed against the top of the wipe-down washer 50 to compact the depolarizer mix 40 against the inner surface of the liner sheet 32 and the outerwall 46 of the positive terminal 42 and form a "bobbin." As a result of this compacting step, the bottom washer 34 deforms somewhat into a dimpled configuration with the central portion thereof extending through aperture 38 against can base 16, the intermediate portions thereof lying atop the inwardly directed liner sheet flanges 36 and the upwardly extending outer flanges thereof abutting the bottom portion of the sidewall of liner sheet 32.

The compacted depolarizer mix 40 extends upwardly to a level $L_3$ substantially lower than the level $L_2$ of the top of the liner sheet 32. More particularly, the level $L_3$ of the top of depolarizer mix 40 is substantially adjacent the level of the bottom surface 24 of band 20. As the band 20 electrically insulates a segment of the negative terminal 12 (that is, a segment of the can sidewall 18), any degree to which the depolarizer mix 40 extends upwardly above the band bottom surface 24 represents a decrease in the efficiency of the battery over that which would be obtained in the absence of the band 20. Accordingly, it is preferred that the level $L_3$ of the top of depolarizer mix 40 be substantially at or below the level of the band bottom surface 24.

Figure 4:
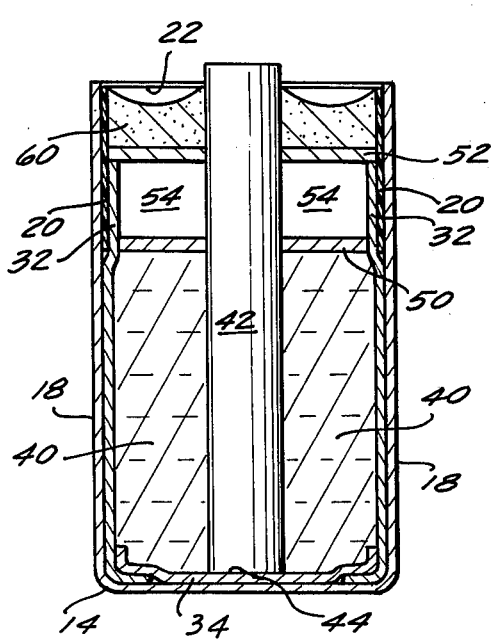
FIG. 4 is a sectional elevational view of the components of FIG. 3 after addition thereto of a subseal washer and pitch seal to form the assembled battery.

Referring now to FIG. 4, a sub-seal washer 52, apertured to permit passage therethrough of the positive terminal 42, is inserted into the can 14 until the periphery of the bottom surface of the sub-seal washer 52 rests just above the top of the liner sheet 32. As the upper surface of the wipe-down washer 50 is substantially below the top level $L_2$ of the liner sheet 32, a compartment 54 is formed between the sub-seal washer 52 and the wipe-down washer 50 any hydrogen forming adjacent the negative terminal 42 during use of the battery can escape upwardly (through the wipe-down washer/liner sheet seal) into compartment 54 where it does not interfere with the efficiency of the battery operation.

Finally, the can 14 is sealed to prevent the escape of moisture from the contents thereof. This may be accomplished by applying a sealant 60, such as a mass of pitch (asphalt) on top of the sub-seal washer 52 and subjecting the pitch 60 to a flaming operation which results in bonding of the pitch 60 to the inner surface of band 20 and any exposed portion of the can sidewall 18 thereabove. The insulating material forming band 20 is selected, at least in part, for its ability to bond well with the pitch under the conditions of the flaming operation. Alternatively, the composition of band 20 may be selected to enable bonding of the pitch 60 to the band 20 under conditions less vigorous than those used in the flaming operation, in which case the flaming operation can be dispensed with and milder conditions relied upon to secure the desired seal of the pitch 60 to the band 20 on can sidewall 18. Indeed, the pitch 60 may be replaced by any other sealant capable of bonding with both the positive terminal outerwall 46 and the band 20 to effect a gas-tight seal, and, indeed, a mechanical seal may also be employed in place of the sealant.

It will be noted that band 20 extends over the full 360° inner circumference of the can 14 substantially from a first point below the level $L_2$ of the upper end of the liner sheet 32 to a second point substantially above level $L_2$. As the band upper surface 22 is substantially above the upper end of liner sheet 32, any unwanted accumulation of depolarizer mix 40 at the top of the liner sheet 32 is unable to "bridge" or "short circuit" the depolarizer mix 40 and the can 14. In other words, to create a short circuit between the depolarizer mix 40 and the can 14, the smears would have to extend not just over the top of the liner sheet 32, but also over the top of the band 20 as well, a highly unlikely occurrence if even a modicum of care is utilized in the manufacturing process.

The bottom surface 24 of band 20 is not only substantially below the level $L_2$ of the upper end of the liner sheet 32, but also preferably substantially adjacent to the level $L_3$ of the upper surface of the depolarizer mix 40. Any portion of the depolarizer mix 40 extending above the band of bottom surface 24 is blocked from direct electrolytic interaction with the adjacent segment of the sidewall 18 by the insulating band 20 and the efficiency of the battery thus impaired—i.e., depolarizer mix is not being utilized. Accordingly, it is preferred that the band bottom surface 24 be at or above the level $L_3$ of the upper surface of the depolarizer mix 40 so that the presence of the band 20 does not impair the efficiency of the battery.

With the exception of the band 20, all the components of the present invention may be of conventional materials, for example, those conventionally used in the well known zinc/carbon dry cell. In this case the can 14 is made of zinc and the positive terminal 42 is a carbon rod. The wipe-down washer 50 and the sub-seal washer 52 may both conveniently be formed of stiff paper, typically having a thickness of about 1 mm. The bottom washer 34 is typically formed of a coated or uncoated kraft-type paper. The liner sheet 32 is typically formed of a kraft-type absorbent paper, such as may be made in part from cereal or methylcellulose, which is permeable to the ions of the electrolyte yet prevents direct electrical contact between the terminals through the depolarizer mix.

To summarize, the present invention utilizes a strategically placed band of electrically insulating material on the sidewall of the can to electrically insulate a can sidewall segment so that smears of depolarizer mix extending over the top of the liner sheet cannot come into electrical contact with the can sidewall. So long as the band does not extend below the level of the top of the depolarizer mix, the efficiency of the resultant batter is in no way impaired by the presence of the band. The band is inexpensive to provide, yet greatly reduces the number of battery rejections due to smears, and thus substantially improves the economic efficiency of the battery making process.

Now that the preferred embodiments of the present invention have been shown and described, various modifications and improvements thereon will become readily apparent to those skilled in the art. Accordingly, the spirit and scope of the present invention is to be limited only by the appended claims, and not by the foregoing disclosure.

We claim:
1. In a paper lined dry cell battery comprising:
(A) a first terminal comprising a receptacle having a base and a sidewall extending upwardly therefrom to a given height;
(B) a second terminal disposed within said receptacle but spaced therefrom;
(C) an ion-permeable liner disposed within said receptacle between said second terminal and said receptacle and extending upwardly to a second height less than said given height; and
(D) a mass of depolarizer mix including an electrolyte disposed between said second terminal and said liner and extending upwardly to a third height less than said second height;
the improvement comprising a band formed substantially of electrically insulating material and disposed over the full circumference of the inner surface of said receptacle sidewall substantially from a first point below the level of the upper end of said liner to a second point substantially thereabove, thereby to electrically insulate a segment of said receptacle sidewall, said band being a separate entity and from said liner unattached thereto and secured to said inner surface of said receptacle sidewall.

2. The battery of claim 1 wherein said second point is substantially at the upper end of said receptacle sidewall.

3. The battery of claim 2 wherein said first point is substantially adjacent the upper surface of said depolarizer mix.

4. The battery of claim 1 wherein said second point is substantially below the upper end of said receptable sidewall.

5. The battery of claim 4 wherein said first point is substantially adjacent the upper surface of said depolarizer mix.

6. The battery of claim 1 wherein said first point is substantially adjacent the upper surface of said depolarizer mix.

7. The battery of claim 1 wherein said band comprises a spray coating on said receptacle sidewall.

8. The battery of claim 1 wherein said insulating material is an alkyd resin.

9. The battery of claim 1 wherein said battery is a zinc-carbon Leclanche dry cell battery.

* * * * *